United States Patent [19]

Aoyagi et al.

[11] Patent Number: 5,173,887
[45] Date of Patent: Dec. 22, 1992

[54] DISK PLAYER PICKUP CONTROL SYSTEM

[75] Inventors: Yoshio Aoyagi; Hiroyuki Abe, both of Saitama, Japan

[73] Assignee: Pioneer Electronic Corporation, Tokyo, Japan

[21] Appl. No.: 913,994

[22] Filed: Jul. 17, 1992

Related U.S. Application Data

[63] Continuation of Ser. No. 450,195, Dec. 13, 1989, abandoned.

[30] Foreign Application Priority Data

Dec. 13, 1988 [JP] Japan .............................. 63-312856

[51] Int. Cl.⁵ .............................................. G11B 21/10
[52] U.S. Cl. .................................... 369/32; 360/78.14
[58] Field of Search .................... 360/75, 78.04, 78.13, 360/78.14; 369/32; 358/342

[56] References Cited

U.S. PATENT DOCUMENTS

| | | | |
|---|---|---|---|
| 4,593,329 | 6/1986 | Hayakama | 360/78.13 |
| 4,685,007 | 8/1987 | Nazarian et al. | |
| 4,710,832 | 12/1987 | Itoh | 358/342 |
| 4,752,922 | 6/1988 | MacAnally et al. | 369/32 |
| 4,805,162 | 2/1989 | Stahl et al. | 369/32 |
| 4,879,705 | 11/1989 | Aoyagi et al. | 369/32 |

FOREIGN PATENT DOCUMENTS

| | | |
|---|---|---|
| 90379 | 10/1983 | European Pat. Off. . |
| 168668 | 1/1986 | European Pat. Off. . |
| 325434 | 7/1989 | European Pat. Off. . |
| 2718092 | 11/1977 | Fed. Rep. of Germany . |
| 3826752 | 2/1989 | Fed. Rep. of Germany . |

OTHER PUBLICATIONS

Patents Abstracts of Japan, P-657, Jan. 21, 1988, vol. 12/No. 19 (Japanese Abstract Publication No. 62-173634).

Patents Abstracts of Japan, P-708, May 26, 1988, vol. 12/No. 178 (Japanese Abstract Publication No. 62-287429).

Primary Examiner—Donald McElheny, Jr.
Attorney, Agent, or Firm—Sughrue, Mion, Zinn, Macpeak & Seas

[57] ABSTRACT

A method for controlling the operation of a disk player pickup control system includes the steps of reading position data representing the present position of a pickup from a disk, calculating the distance from the present position to the home position of the pickup according to the position data thus read, and moving the pickup to the home position according to the distance thus calculated. The above-described method for operating the control system is particularly advantageous in that it allows the pickup of a disk player, which does not include a mechanical limit switch, to be moved to the home position.

2 Claims, 3 Drawing Sheets

DISK PLAYER PICKUP CONTROL SYSTEM

This is a continuation of U.S. patent application Ser. No. 450,195, filed Dec. 13, 1989, now abandoned.

BACKGROUND OF THE INVENTION

1. Field of the Invention

This invention relates to a disk player, and more particularly to a system of moving its pickup to the home position in the disk player.

2. Prior Art Description

In general, in optical disks such as digital audio disks and video disks, the record data start point is positioned in the inner periphery, in which table-of-contents (hereinafter referred to merely as "TOC", when applicable) data such as the number of program data recorded therein and addresses representing the positions of the program data are recorded.

In playing such a disk, first the TOC is read with the pickup, then the pickup is moved to the start position of a program data specified, and the pickup is moved along the tracks from the start position towards the outer periphery of the disk. Hence, in the disk player, in order to quickly start a disk playing operation every time, the pickup is moved near to the position of TOC of the disk (hereinafter referred to as "a home position", when applicable) at the end of each disk playing operation.

In a conventional disk player, the pickup is moved to the home position by a mechanical switch disposed near it. More specifically, the pickup is moved to the home position when a disk playing operation is suspended or accomplished as follows: The pickup is moved inwardly of the disk, and is then stopped at the position where the mechanical switch is operated by the pickup. This position is the home position.

As was described above, in the conventional disk player, the arrival of the pickup at the home position is detected by the mechanical switch disposed near the home position. Therefore, the conventional pickup control system suffers from a difficulty that the mechanical switch must be positioned with high accuracy, and the efficiency of the disk player assembling work is lowered as much. On the other hand, the home position and the record data start position of the disk may be shifted from each other when the disk is used for a long time or because of the eccentricity of the disk. Thus, it is not preferable to employ such a stationary switch to determine the home position of the pickup.

SUMMARY OF THE INVENTION

Accordingly, an object of this invention is to provide a disk player in which no mechanical switch is employed to move the pickup to the home position.

The foregoing object of the invention has been achieved by the provision of a disk player pickup control system in which, according to the invention, position data representing the present position of a pickup is read from a disk in which program data have been recorded, the distance from the present position to the home position of the pickup is calculated according to the position data thus read, and the pickup is moved to the home position according to the distance thus calculated.

The pickup is moved to the home position, for instance, in order to suspend the playback of the disk, or to eject the disk, or to read the TOC to start the playback of the disk. For this purpose, first address data is read from the disk with the pickup to detect the present position of the pickup, and then the distance of the pickup from the present position thus detected to the home position is calculated, and, according to the distance thus calculated, a carriage motor is controlled to move the pickup for the distance. Thus, the pickup is positioned at the home position.

DETAILED DESCRIPTION OF THE INVENTION

Figure 1:
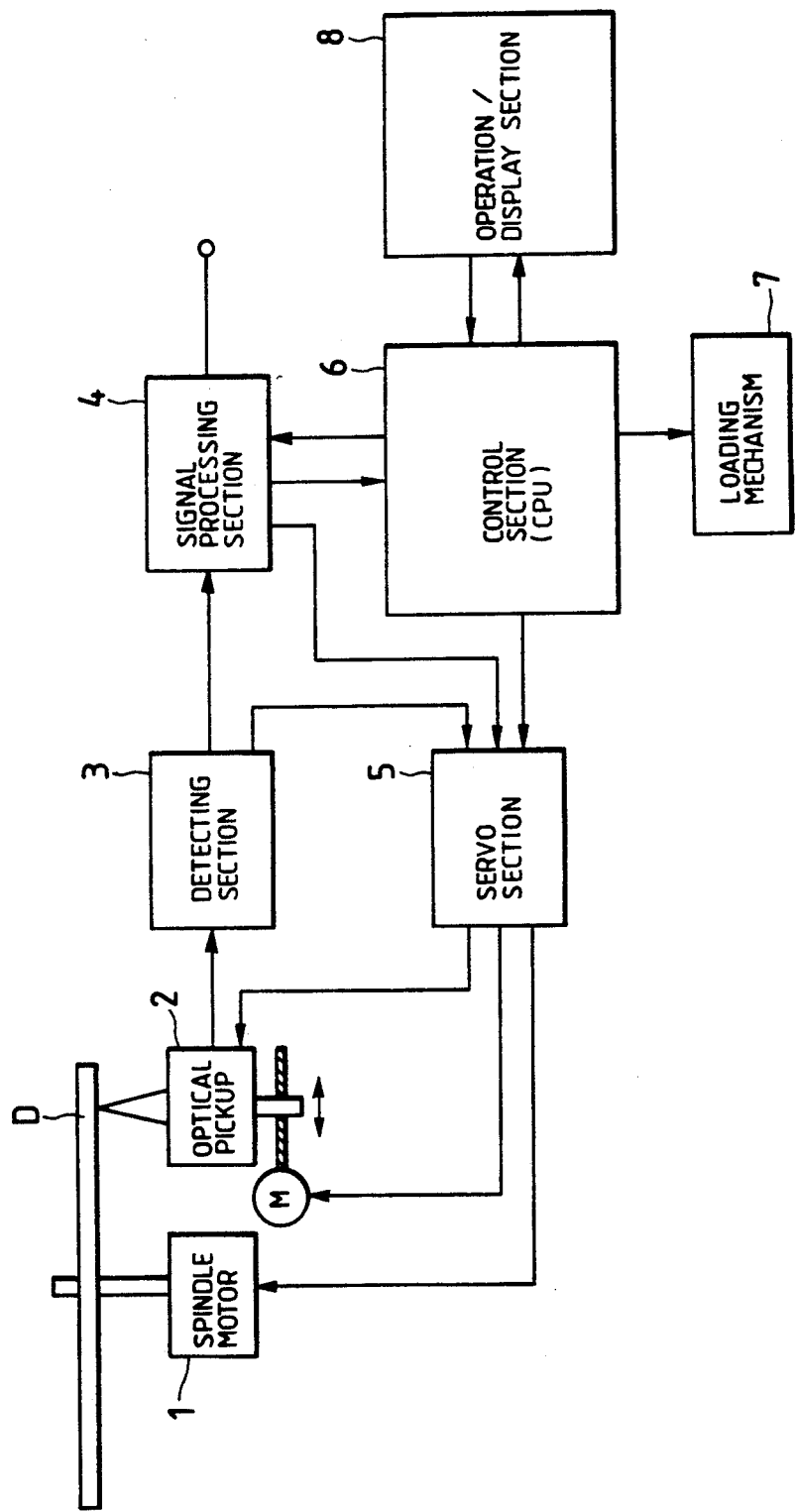
FIG. 1 is an explanatory diagram, partly as a block diagram, showing the arrangement of one embodiment of this invention.

FIG. 1 is a block diagram showing the arrangement of digital audio disk player which is one embodiment of this invention.

In the disk player, a disk D is rotated by a spindle motor 1. In the case of a compact disk, it is driven at a constant linear velocity (CLV), a linear velocity of 1.2 m/s to 1.4 m/s, and about 500 rpm in the inner periphery and about 200 rpm in the outer periphery.

The disk D has three areas; a lead-in area where TOC is recorded, a program area where music signals are recorded, and a lead-out area where a program end signal is recorded, which are arranged in the stated order radially outwardly of the disk; that is, the lead-in area is the innermost area, the lead-out area is the outermost area, and the program area is located between the lead-in area and the lead-out area. The TOC, as was described above, is the data which includes the number of program data (hereinafter referred to as "music data" or "pieces of music", when applicable), the addresses (positions on the disk) of the start, intervals and end of each piece of music, the time of performance of each piece of music, and the total time of performance of all pieces of music. The TOC data are repeatedly recorded in the disk until the start position of the program area occurs. The music data recorded in the program are a plurality of frames each having a synchronizing signal, a sub-code of control data and expansion feature data, data bits of music signals, and error correcting bits for correcting errors in the data bits. The sub-codes further include address data.

The data recorded in the disk D are read with an optical pickup 2, and supplied to a detecting section 3. The detecting section 3 reads a record signal out of the signal subjected to photo-electric conversion by the optical pickup 2, and applies it to a signal processing section 4, and supplies error signals such as a focusing error signal and a tracking error signal to a servo section 5.

In the signal processing section 4, the record signal is shaped into a digital signal to detect the synchronizing signal, demodulate the music signal, and to detect the sub-code. The music signal is subjected to digital-to-analog conversion, so that it is outputted as an analog audio signal, a part of the synchronizing signal is applied to the servo section 5, and the sub-code is applied to a control section (CPU) 6.

In response to the error signal from the detecting section 3, the synchronizing signal from the signal processing section 4, and control signals from the control section 6, the servo section 5 outputs servo signals for a focus servo that the focus coil of the optical pickup 2 is controlled to focus the light beam on the reflecting surface of the disk D, a tracking servo that the tracking coil of the optical pickup 2 is controlled so that the light beam is applied to an aimed tracking, a carriage servo that a carriage motor M is controlled so as to move the body of the optical pickup 2 radially of the disk D, and a CLV servo that the spindle motor M is driven at a constant linear velocity.

The control section 6 is made up of a microcomputer, to output control signals for controlling the above-described various sections in the disk player. The control section 6 further controls a loading mechanism 7 for loading a disk D on the disk player and unloading it therefrom.

The disk player further comprises an operation/display section 8. The operation/display section 8 comprises; a group of controls such as a play switch for reproducing music data recorded on the disk D, a stop switch for suspending the reproduction of music data, an ejection switch for removing a disk D from the disk player, a group of display units such as a display unit for displaying the operations of those controls, and a display unit for displaying the number of music data being reproduced and the performance time thereof.

The operation of the disk player thus constructed with respect to the movement of the optical pickup to the home position will be described.

Figure 2:
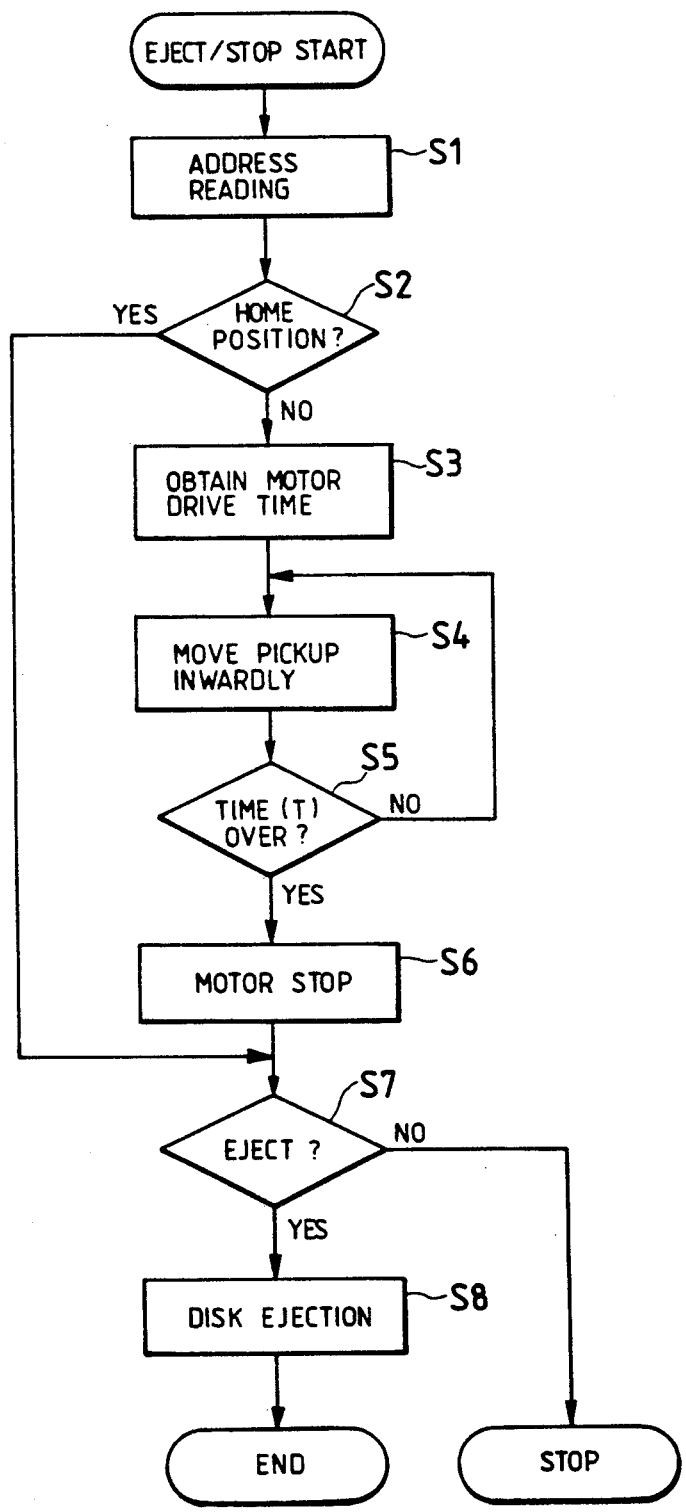
FIG. 2 is a flow chart for a description of the operations of ejecting a disk and stopping it in the embodiment of the invention.

FIG. 2 is a flow chart for a description of the operation of returning the pickup 2 to the home position when the eject switch or the stop switch on the operation/display section 8 is operated.

First, in order to detect the present position of the pickup 2, the address data recorded in the sub-code is read from the disk D (Step S1), and it is determined whether or not the pickup 2 is at the home position (Step S2). If the pickup 2 is not at the home position, the distance between the present position and the home position is calculated, thereby to obtain the time required for movement; i.e., the time T for driving the carriage motor M (Step S3). Then, the pickup 2 is moved for the time T (Steps S4 and S5), and the carriage motor M is stopped (Step S6). The position of the pickup thus stopped is the home position.

Thereafter, it is determined, which switch is operated in the operation/display section 8, that is, the eject switch or the stop switch (Step S7). When the eject switch is operated, the loading mechanism 7 performs a disk ejecting operation to eject the disk D from the disk player (Step S8). When the stop switch is operated, the disk player is stopped as it is.

Figure 3:
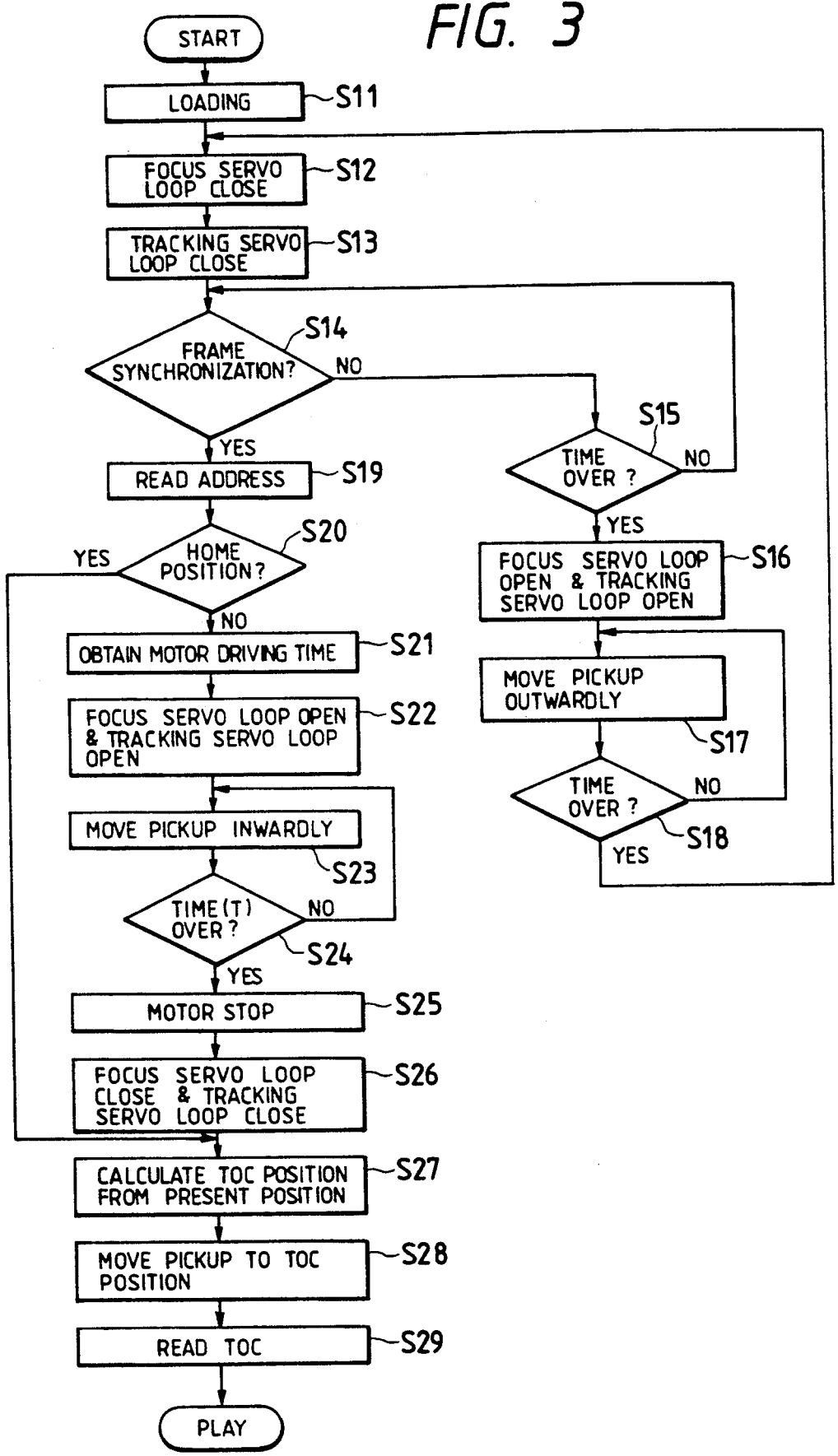
FIG. 3 is a flow chart for a description of the operation of starting the playback of a disk in the embodiment of the invention.

FIG. 3 is a flow chart for a description of an operation of starting the playback of a disk.

When a disk D is loaded into the disk player by the loading mechanism (Step S11), the focus servo loop is closed for focusing operation (Step S12). Then, the tracking servo loop is closed for tracking operation (Step S13).

Thereafter, a frame synchronizing signal is read from the disk D to determine whether or not a frame synchronization is obtained within a predetermined period of time(Steps S14 and S15). When the frame synchronization is not established within the predetermined period of time, it is determined that the pickup 2 is positioned over the mirror surface area inside the lead-in area of the disk D, and therefore the pickup 2 is moved outwardly of the disk D. That is, the focus servo loop and the tracking servo loop are opened (Step S16), and the pickup 2 is moved outwardly for a predetermined period of time (Steps S17 and S18), and Step S12 is effected again.

When the frame synchronization is established in Step S14, in order to detect the present position of the pickup 2, the address data is read from the disk D (Step S19). That is, it is determined whether or not the pickup 2 is at the home position (Step S20).

As was described, normally before the disk is ejected, the pickup 2 is moved to the home position. However, for instance, in the case where the power switch is turned off without ejection of the disk, the pickup may not be moved to the home position. Hence, before the playback of a disk, it is determined whether or not the pickup 2 is at the home position. If it is determined that the pickup 2 is not at the home position, then control is made to move the pickup 2 to the home position.

First, the distance between the present position of the pickup and the home position is calculated, and the time required for movement of the pickup; i.e., the time required for driving the carriage motor M is obtained (Step S21). Then, the focus servo loop and the tracking servo loop are opened (Step. S22) and thereafter the pickup 2 is moved inwardly of the disk D for the time T (Steps S23 and S24). When the time T has passed, the carriage motor M is stopped (Step S25). The focus servo loop is closed again for focusing the light beam, and the tracking servo loop is also closed again for tracking the light beam (Step S26).

Under the condition that the pickup 2 has been moved to the home position, the address data is read from the disk D, and according to the address data thus read the TOC position is calculated (Step S27). The pickup 2 is moved to the TOC position thus calculated (Step S28), where the contents of the TOC is read with the pickup 2 (Step S29), and the playback of the disk is carried out. When in Step S20 it is determined that the pickup 2 is located at the home position, Step S27 is effected to read the TOC, As was described before, the TOC includes a variety of data necessary for starting the playback of the disk. Therefore, it is essential to read the TOC before the playback of the disk.

In the above-described embodiment, the pickup is moved to the home position when the disk is ejected, or stopped, or played back. However, it should be noted that the invention is not limited thereto or thereby. That is, it goes without saying that the technical concept of the invention is applicable to the case for instance where the light beam is defocused during reproduction, and therefore the light beam must be focused again with the pickup moved to the home position.

In the disk player pickup control system according to the invention, the present position of the pickup is detected from the address data, and the distance between the present position and the home position is calculated, and the pickup is moved for the distance thus calculated so that it is positioned at the home position. That is, the pickup control system of the invention, being simple in arrangement, can move the pickup to the home position without employment of a mechanical switch.

What is claimed is:

1. A method for operating a disk player pickup control system, said method comprising the steps of:

when starting reproduction of program data recorded on a disk, reading inherent data of said disk recorded at a predetermined position on said disk defining a home position of said pickup;

reading position data representing a present position of a pickup from said disk in which said program data have been recorded;

calculating a distance from said present position to said home position of said pickup according to said position data thus read; and moving said pickup to said home position according to the distance thus calculated.

2. The method of claim 1, further comprising the step of:

obtaining a driving time of a carriage motor for moving said pickup to said home position according to the distance calculated in said calculating step.

* * * * *